July 12, 1960 G. COLLAVOLI 2,945,103

BRAKE FLUID LEVEL INDICATOR

Filed May 12, 1959

INVENTOR
Guido COLLAVOLI
BY Pierre Espérance

PATENT AGENT

United States Patent Office 2,945,103
Patented July 12, 1960

2,945,103

BRAKE FLUID LEVEL INDICATOR

Guido Collavoli, 7101 Cartier St., Montreal, Quebec, Canada

Filed May 12, 1959, Ser. No. 812,742

1 Claim. (Cl. 200—84)

The present invention relates to a signalling device particularly used in combination with a motor vehicle and more specifically associated with the brake fluid reservoir used for feeding the fluid to the master brake cylinder; said signalling device is adapted to give a warning whenever the brake fluid level within the reservoir drops below a minimum level.

The present invention is characterised by the provision of a float operated switch responsive to the fluid level within the reservoir and which is of improved and simplified construction and is so arranged that it can be used in association with brake fluid reservoirs of practically all types.

Yet another important object of the present invention is the provision of a device of the character described, in which the float operative switch which is entirely prefabricated and assembled and can be installed as a unit on existing brake fluid reservoirs with a minimum of work and time and without in any way modifying the reservoir construction.

Yet another important object of the present invention is the provision of a switch of the character described which is of inexpensive and yet durable construction.

The foregoing and other important objects of the present invention will become more apparent during the following disclosure and by referring to the drawings, in which.

Figure 1:
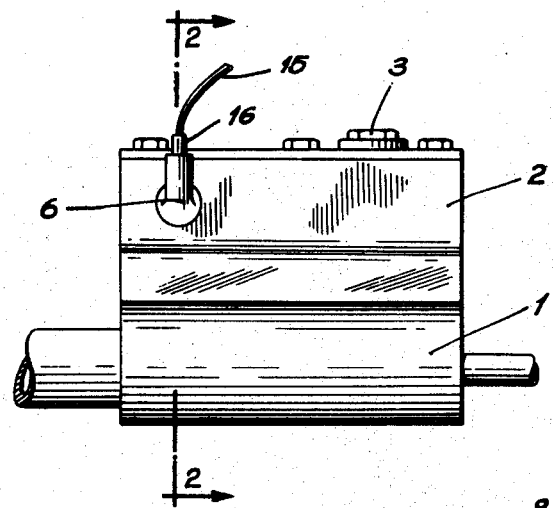
Figure 1 is a side view of a brake cylinder and reservoir for use in automobile braking system and equipped with the present invention.
Figure 2:
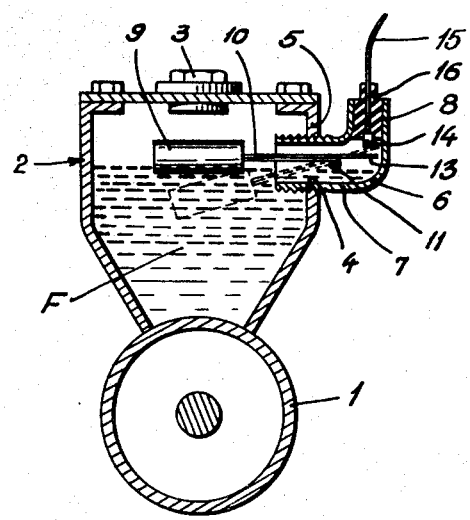
Figure 2 is a section taken along line 2—2 of Figure 1.
Figure 3:
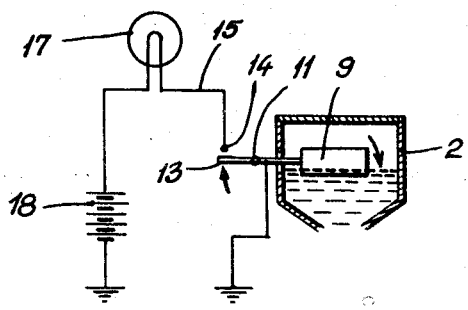
Figure 3 is a diagrammatic section showing the signal circuit with which the float operated switch is associated.

Referring now more particularly to the drawings, in which like reference characters indicate like elements throughout, reference numeral 1 indicates a brake cylinder for a motor vehicle and which is associated with a reservoir 2 for the brake liquid, said reservoir 2 having any conventional form and being provided with a filling opening normally closed by plug 3.

In accordance with the present invention, a hole 4 is tapped in a side wall 5 of the reservoir 2 at approximately the minimum brake fluid level it is desired to maintain in the reservoir 2.

An elbow 6 is threadedly connected within the hole 4 by means of its externally threaded horizontal branch 7, the right angle branch 8 being arranged vertically. A float member 9 of hollow metal or plastic construction, has a cylindrical shape of a diameter not greater than the maximum diameter of the threaded part of the branch 7 of elbow 6, such that the float 9 can be easily inserted through the tapped hole 4.

The float 9 is permanently attached to a lever arm 10 pivotally mounted on a cross pin 11 which is secured to the branch 7 and extends transversely thereof across its longitudinal axis.

The lever arm 10 may be simply made of sheet metal folded over itself to provide two layers; the outer end of the lower layer is bent into a loop surrounding the cross pin 11 and serves as a journal for the lever arm; the upper layer extends beyond the cross pin 11 to form an extension the outer end of which constitutes a movable electrical contact 13 adapted to abut a stationary electrical contact 14 which is constituted by a head formed at the lower end of an electrical wire 15 which has its terminal portion passing through and held in position by an insulating bushing 16 tightly fitted within the vertical branch 8 of the elbow 6.

The wire 15 is extended to the dash board of the motor vehicle and is connected to a warning light 17 mounted in conventional manner in a socket on the dash board; the other terminal of the light is connected to the positive side of the car battery 18. The lever arm 10 is grounded through cross pin 11 and elbow 6 thereby completing the electric circuit when the float operated switch is closed with the two contacts abutting each other.

The brake fluid F within the reservoir 2 is normally at a level higher than the horizontal branch 7 of the elbow 6 but lower than the top of vertical branch 8 such that it fills that horizontal branch but will not overflow even if there is a leak at bushing 16. The fact that the contacts are immersed in oil in no way impairs the proper operation of the switch; moreover, due to the low voltage and the low amperage in the lamp circuit, the arc that may be struck when the contacts are opened is not strong enough to cause ignition of the oil. The oil has the advantage of properly lubricating the pivotal connection at the cross pin 11 and to protect the parts against rust.

From the construction of the float operated switch of the present invention, it will be obvious that said switch is completely pre-assembled before being mounted in position within reservoir 2 which considerably reduces the cost of installation in the reservoir and also the switch of the present invention is of such small dimension that it can fit any type of brake fluid reservoir in commercial use.

Once the switch is in position, it is possible to bend more or less the lever arm 10 adjacent the outlet end of the elbow branch 7 in order to make a fine adjustment for the minimum level of brake fluid at which it is desired that the light bulb lights up.

While a preferred embodiment of the present invention has been illustrated and described, it is understood that various modifications may be resorted to without departing from the spirit and scope of the appended claim.

What I claim is:

An electrical signalling device comprising an elbow shaped conduit member having a threaded end adapted to be threadedly connected within a tapped hole of a liquid reservoir, a plug of insulating material closing the right angle branch of said elbow, an electrical wire passing through said plug secured in position thereby and insulated from the elbow, a head at the lower end of said wire forming a stationary electrical contact, a lever pivoted intermediate its ends on a cross pin secured to and extending within the threaded branch of said elbow, said lever arm projecting outwardly of said elbow at one end, and having its inner end forming a movable electrical contact adapted to abut said stationary contact within said elbow, and a float member attached to the projecting outer end of said lever arm, said float member having a cylindrical shape of a diameter not greater than the maximum diameter of the threaded part of the branch of said elbow.

References Cited in the file of this patent

UNITED STATES PATENTS

| | | |
|---|---|---|
| 2,800,550 | Pettine | July 23, 1957 |
| 2,855,479 | Motta | Oct. 7, 1958 |
| 2,866,866 | LaPlante | Dec. 30, 1958 |